United States Patent
Mamy et al.

(10) Patent No.: US 8,322,321 B2
(45) Date of Patent: Dec. 4, 2012

(54) INTERNAL COMBUSTION ENGINE INLET MANIFOLD

(75) Inventors: Laurence Mamy, Versailles (FR); Samuel Rodriguez, Toulouse (FR)

(73) Assignee: Renault S.A.S., Boulogne-Billancourt (FR)

( * ) Notice: Subject to any disclaimer, the term of this patent is extended or adjusted under 35 U.S.C. 154(b) by 146 days.

(21) Appl. No.: 12/671,822

(22) PCT Filed: Jun. 25, 2008

(86) PCT No.: PCT/FR2008/051145
§ 371 (c)(1),
(2), (4) Date: Sep. 24, 2010

(87) PCT Pub. No.: WO2009/019350
PCT Pub. Date: Feb. 12, 2009

(65) Prior Publication Data
US 2011/0000454 A1     Jan. 6, 2011

(30) Foreign Application Priority Data
Aug. 3, 2007  (FR) ...................................... 07 05693

(51) Int. Cl.
*F02M 35/104*  (2006.01)
(52) U.S. Cl. ............... 123/184.38; 123/184.53

(58) Field of Classification Search ........... 123/184.21–184.24, 184.38–184.46, 123/184.53
See application file for complete search history.

(56) References Cited

U.S. PATENT DOCUMENTS
2003/0029408 A1  2/2003  Kallander

FOREIGN PATENT DOCUMENTS

| DE | 198 01 204 | 7/1999 |
|---|---|---|
| EP | 1 283 353 | 2/2003 |
| FR | 2 879 262 | 6/2006 |
| JP | 63208616 A | 8/1988 |
| JP | 10 047175 | 2/1998 |
| JP | 11350963 A | 12/1999 |
| JP | 2003 074357 | 3/2003 |

*Primary Examiner* — Noah Kamen
(74) *Attorney, Agent, or Firm* — Oblon, Spivak, McClelland, Maier & Neustadt, L.L.P.

(57) ABSTRACT

An internal combustion engine inlet manifold including an inlet duct with an axis of symmetry, the inlet duct being open at one end and closed at the other end and opening on its lateral surface onto a plurality of outlet ducts, the open end allowing an inlet flow to pass, each outlet duct being associated with one cylinder of the engine. Each outlet duct is connected by a blend radius to the inlet duct in the opposite way to the direction of travel of the inlet flow. The blend radius of each duct increases as a function of the path length of the inlet flow from the open end to the axis of symmetry of the respective duct so as to distribute the inlet flow to each duct with uniform permeability.

6 Claims, 1 Drawing Sheet

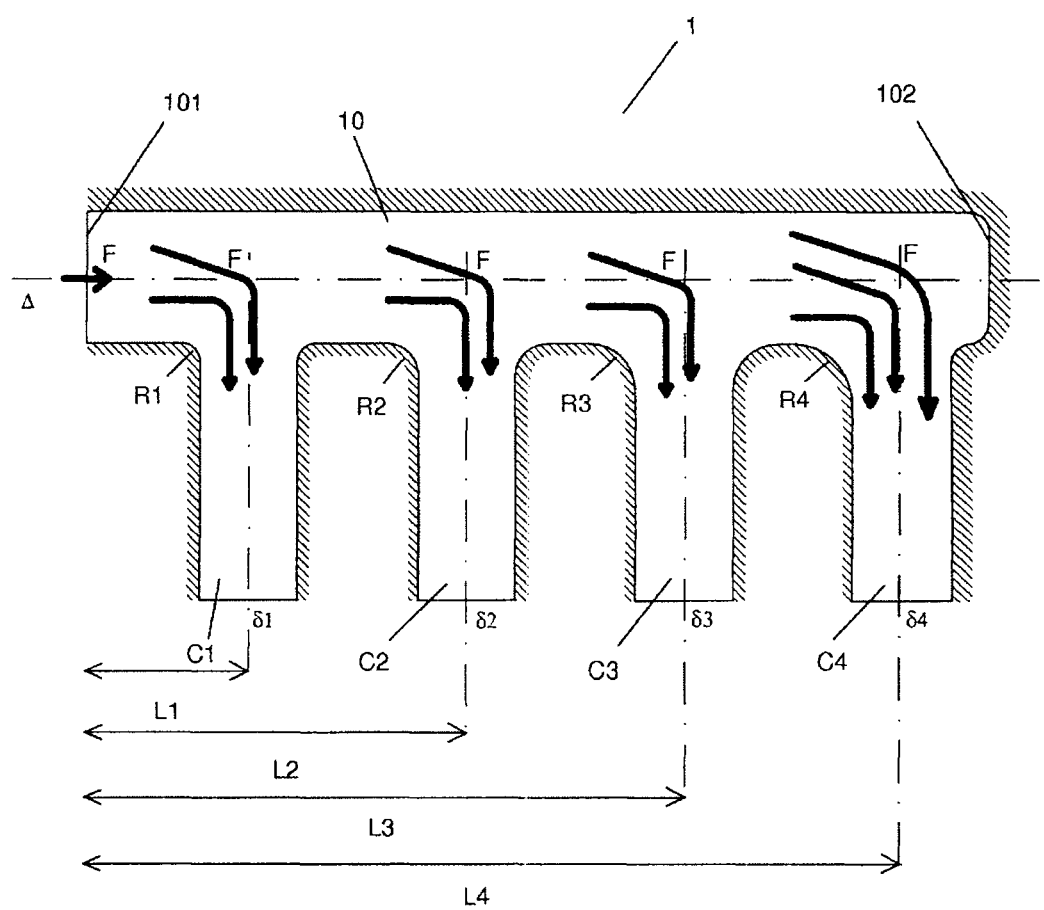

INTERNAL COMBUSTION ENGINE INLET MANIFOLD

BACKGROUND

The present invention relates to the field of motor vehicle internal combustion engines and in particular proposes an inlet manifold.

As is known, the inlet manifold of an internal combustion engine has the task of distributing an inlet flow across all the cylinders of the engine. This inlet flow comes either directly from outside, after simple filtration, and is therefore air, or from a mixture of fresh air and of exhaust gases, metered in this case by an EGR valve. The inlet manifold of an internal combustion engine has to be permeable enough that it guarantees the performance of the internal combustion engine. A certain level of permeability therefore needs to be achieved. This level of permeability is obtained by taking the mean of the permeabilities across all the tracts associated with the various cylinders of the engine when one tract is delivering. However, each tract has to have a permeability similar to the permeabilities of the other tracts so as not to place one cylinder at an advantage or at a disadvantage in relation to the others because this would lead to malfunctioning of the internal combustion engine or would involve the internal combustion engine having to have downgraded settings.

In the case of internal combustion engines, it is known that motor manufacturers are looking to generate an aerodynamic movement of the tumble type (a helicoidal tumbling movement of the inlet flow in the cylinder of the engine and the axis of rotation of which is perpendicular to the axis of the cylinder). This movement, created mainly by the shape of the inlet ducts of the internal combustion engine, consists in encouraging flow over the front of the inlet valves, which corresponds to so-called "conventional" tumble or over the rear of the inlet valves, which corresponds to so-called "reverse" tumble. It is therefore appropriate to ensure that the geometry of the inlet manifold does not cause this level of tumble to drop and does not create any dispersion in the tumble-type movement. Such phenomena could arise particularly when the distribution of the inlet flow leaving the various ducts or tracts of the inlet manifold becomes sufficiently inhomogeneous and disrupts the distribution of the desired velocity of the inlet flow around the inlet valves.

The present-day solutions propose inlet manifolds consisting of an inlet flow inlet duct, the inlet duct being open at one end to allow the inlet flow to pass, and closed at the other end and opening on its lateral surface onto a plurality of identical outlet ducts the axes of symmetry of which are perpendicular to the axis of symmetry of the inlet duct and mutually parallel, each outlet duct being connected to one cylinder of the engine. In this way, the inlet duct of the inlet manifold is able to distribute the inlet flow to the various cylinders of the engine. However, the outlet duct furthest away from the inlet of the inlet flow into the inlet duct is at a disadvantage in terms of permeability in relation to the other outlet ducts because they are closer to this inlet. The problem is that the distance that the inlet flow has to cover is longer.

Also known, from document JP 11350963 and document JP 63208616, are inlet manifolds that improve the performance of an engine and give good distribution of the swirl (helicoidal movement of the inlet flow in the cylinder of the engine and the axis of rotation of which is parallel to the axis of the cylinder) through the addition of bosses, ramps or materials in the tracts associated with the cylinders. However, such additions have huge influence over the permeability of the various tracts associated with the various cylinders.

BRIEF SUMMARY

It is an object of the present invention to alleviate the disadvantages of the prior art by proposing an internal combustion engine inlet manifold that is able to guarantee satisfactory engine performance.

To this end, the inlet manifold for an internal combustion engine, comprising an inlet duct of cylindrical shape and with axis of symmetry ($\Delta$), the inlet duct being open at one end and closed at the other end and opening on its lateral surface onto a plurality of outlet ducts of axis of symmetry ($\delta i$), the open end allowing through an inlet flow which travels along the inlet duct along the axis of symmetry ($\Delta$) from the open end to the closed end near the last outlet duct, each outlet duct being connected to one cylinder of the engine, and the axis of symmetry ($\delta i$) of each outlet duct being perpendicular to the axis of symmetry ($\Delta$) of the inlet duct, is characterized in that each outlet duct is connected by a blend radius to the inlet duct in a way opposite to the direction of travel of the inlet flow and in such a way that the blend radius of each outlet duct increases with the length of the path of the inlet flow from the open end of the inlet duct to the axis of symmetry ($\delta i$) of the respective outlet duct in order to distribute the inlet flow to each outlet duct with equivalent permeability.

According to another special feature, the blend radius (Ri) for each outlet duct is obtained from the following formula:

$$Ri = A \times Li + B$$

Ri and Li being expressed in millimeters;
Li corresponding to the length of the path of the inlet flow from the open end of the inlet duct to the axis of symmetry ($\delta i$) of the respective outlet duct;
A being a coefficient ranging between 0.01 and 0.06 and B being a coefficient ranging between 8 and 11 millimeters.

According to another special feature, the outlet ducts have identical diameters.

According to another special feature, the blend radius of each outlet duct is also intended to encourage a tumble-type aerodynamic movement within each cylinder of the engine.

According to another special feature, the inlet manifold applies to internal combustion engines of the gasoline type or of the diesel type.

BRIEF DESCRIPTION OF THE DRAWINGS

The invention will be better understood, and other objects, features, details and advantages thereof will become more clearly apparent in the course of the explanatory description which will follow, given with reference to the attached figure which is provided solely by way of non-limiting example, the figure illustrating the inlet manifold according to the invention.

DETAILED DESCRIPTION

The inlet manifold (1) according to the invention allows a considerable improvement in the performance of an internal combustion engine of the gasoline or diesel type. Furthermore, motor vehicle manufacturers are looking to generate an aerodynamic movement of the tumble type (a helicoidal tumbling movement of an inlet flow (F) in the cylinder of the engine and the axis of rotation of which is perpendicular to the axis of the cylinder). The inlet manifold (1) according to the invention makes it possible to reduce the negative effect that inlet manifolds of the prior art may have on the tumble-type aerodynamic movement, and may even be able to encourage this tumble-type aerodynamic movement.

With reference to the figure, the inlet manifold (1) for an internal combustion engine comprises an inlet duct (10) of cylindrical shape with axis of symmetry (Δ). The inlet duct (10) is open at one end (101) and closed at the other end (102) and on its lateral surface opens onto a plurality of outlet ducts (Ci) of axis of symmetry (δi). The axis of symmetry (δi) of each outlet duct (Ci) is perpendicular to the axis of symmetry (Δ) of the inlet duct (10), and the axes of symmetry (δi) of each outlet duct (Ci) are mutually parallel. In the example depicted, the inlet duct (10) opens onto four outlet ducts (C1, C2, C3, C4) with respective axes of symmetry (δ1, δ2, δ3, δ4) respective lengths (L1, L2, L3, L4) away from the open end (101) of the inlet duct (10).

The open end (101) allows to pass an inlet flow (F) originating from the engine inlet line, this inlet flow (F) traveling through the inlet duct (10) along the axis of symmetry (Δ) from the open end (101) toward the closed end (102) near the last outlet duct, in the example depicted the outlet duct (C4). It is known that each outlet duct (Ci) is connected to one cylinder of the engine. In the example depicted, the outlet ducts (C1, C2, C3, C4) are cylindrical in shape and have identical diameters.

Each outlet duct (Ci) is connected by a blend radius to the inlet duct (10) in a way opposite to the direction of travel of the inlet flow (F). The blend radius (Ri) of each outlet duct (Ci) increases with the length (Li) of the path of the inlet flow (F) from the open end (101) of the inlet duct (10) to the axis of symmetry (δi) of the respective outlet duct (Ci) in order to distribute the inlet flow (F) to each outlet duct (Ci) with equivalent permeability, the inlet flow (F) traveling through each outlet duct (Ci) along an axis parallel to the axis of symmetry (δi). The blend radius (Ri) for each outlet duct (Ci) is obtained from the following formula:

$$Ri = A \times Li + B$$

where Ri and Li are expressed in millimeters.

Li corresponds to the length of the path of the inlet flow (F) from the open end (101) of the inlet duct (10) to the axis of symmetry (δi) of the respective outlet duct (Ci), A is a coefficient ranging between 0.01 and 0.06 and B is a coefficient ranging between 8 and 11 millimeters.

In the example depicted, the blend radius (R1) of the outlet duct (C1) is obtained from the formula R1=A×L1+10, L1 being the length of the path of the inlet flow (F) from the open end (101) of the inlet duct (10) to the axis of symmetry (δi) of the outlet duct (C1). Thus, since the outlet duct C1 is the one closest to the open end (101) of the inlet duct (10), its blend radius (R1) is the shortest. Further, because the outlet duct C4 is the one furthest from the open end (101) of the inlet duct (10), its blend radius (R4) is the longest.

Increasing the blend radius (Ri) as a function of the length (Li) of the path of the inlet flow (F) from the open end (101) of the inlet duct (10) to the axis of symmetry (δi) of the respective outlet duct (Ci) makes it possible to encourage the inlet flow (F) to pass through the furthermost outlet ducts, in the example depicted, the outlet duct (C4).

In this way, the inlet manifold (1) according to the invention is able to compensate for any degradation in permeability that the outlet ducts furthest from the open end (101) of the inlet duct (10) encounter, while at the same time maintaining a good distribution of velocities in each outlet duct (Ci) so as not to introduce any dispersion that could be detrimental to tumble-type aerodynamic movement.

One of the advantages of the invention is that the inlet manifold (1) is able to guarantee equivalent permeabilities for each duct (Ci) while at the same time encouraging the tumble-type aerodynamic movement.

It should be obvious to those skilled in the art that the present invention allows embodiments in numerous other specific forms without departing from the field of application of the invention as claimed. Hence, the present embodiments are to be considered by way of illustration, but may be modified within the context defined by the scope of the attached claims, and the invention must not be limited to the details given hereinabove.

The invention claimed is:

1. An inlet manifold for an internal combustion engine, comprising:
   an inlet duct of cylindrical shape and with a first axis of symmetry, the inlet duct being open at one end and closed at the other end and opening on its lateral surface onto a plurality of outlet ducts of a second axis of symmetry, the open end allowing through an inlet flow which travels along the inlet duct along the first axis of symmetry from the open end to the closed end near the last outlet duct, each outlet duct being connected to one cylinder of the engine, and the second axis of symmetry of each outlet duct being perpendicular to the first axis of symmetry of the inlet duct,
   wherein each outlet duct is connected by a blend radius to the inlet duct in a way opposite to the direction of travel of the inlet flow and such that the blend radius of each outlet duct increases with the length of the path of the inlet flow from the open end of the inlet duct to the second axis of symmetry of each respective outlet duct to distribute the inlet flow to each outlet duct with equivalent permeability.

2. The inlet manifold as claimed in claim 1, wherein the blend radius for each outlet duct is obtained from formula:

$$Ri = A \times Li + B$$

Ri and Li being expressed in millimeters;
   Li corresponding to a length of the path of the inlet flow from the open end of the inlet duct to the second axis of symmetry of each respective outlet duct; and
   A being a coefficient ranging between 0.01 and 0.06, and B being a coefficient ranging between 8 and 11 millimeters.

3. The inlet manifold as claimed in claim 2, wherein the outlet ducts have identical diameters.

4. The inlet manifold as claimed in claim 1, wherein the outlet ducts have identical diameters.

5. The inlet manifold as claimed in claim 1, wherein the inlet manifold includes four of the outlet ducts.

6. The inlet manifold as claimed in claim 5, wherein the outlet ducts have identical diameters.

* * * * *